(No Model.) 2 Sheets—Sheet 2.
J. J. JOHNSTON.
FRUIT DRIER.
No. 253,609. Patented Feb. 14, 1882.
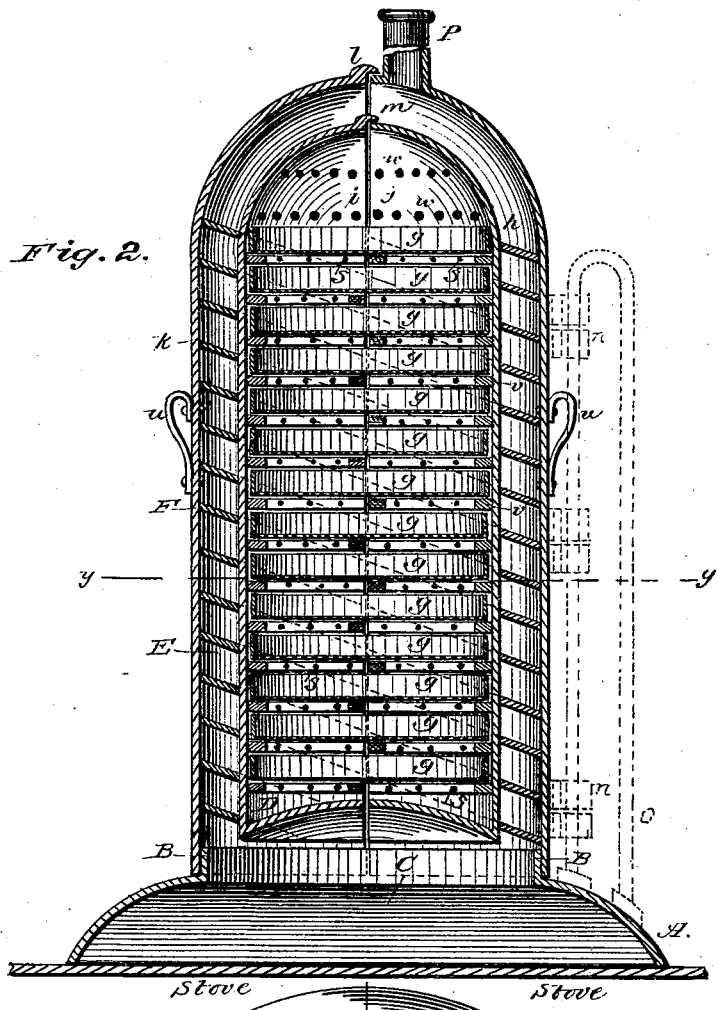

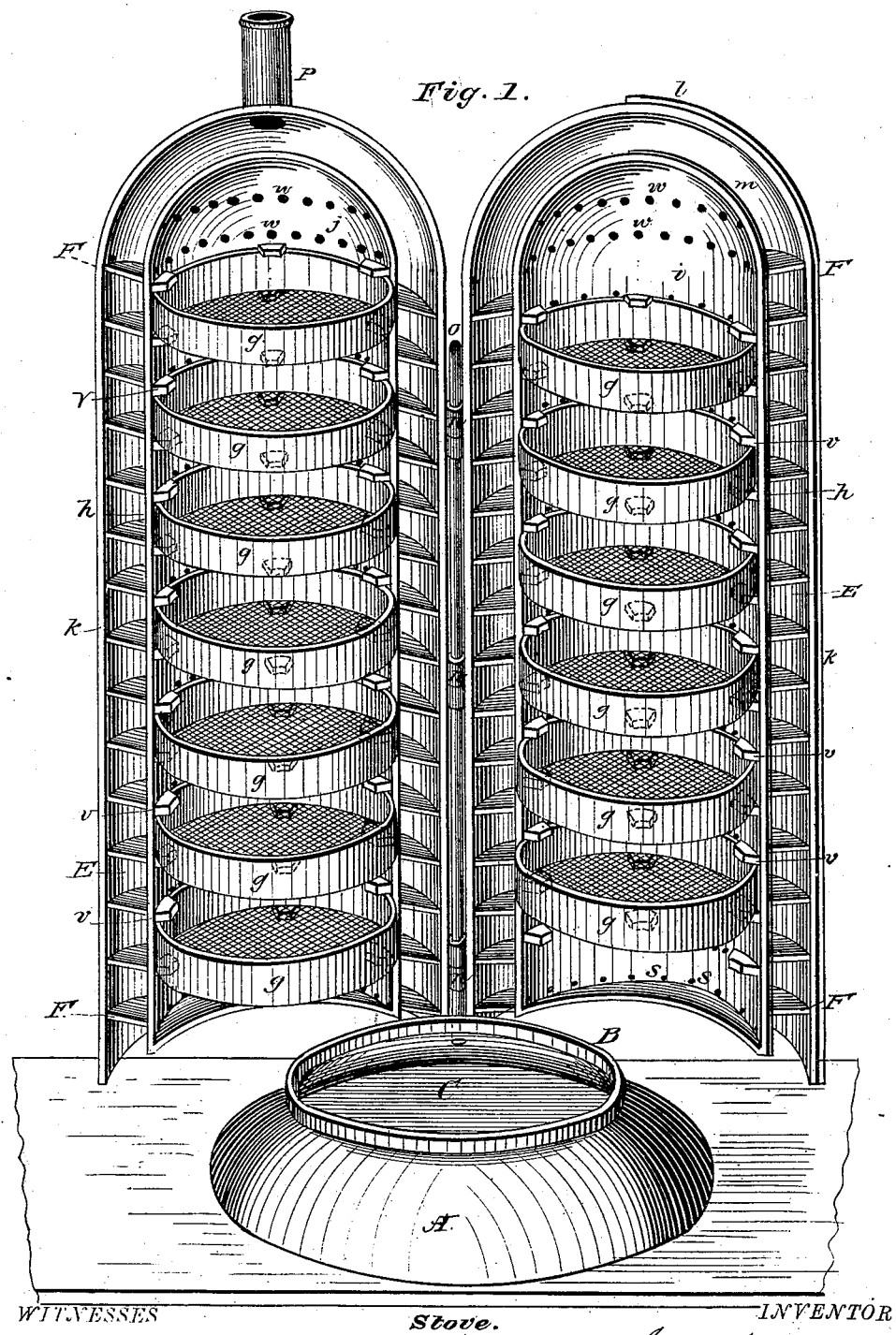

UNITED STATES PATENT OFFICE.

JAMES J. JOHNSTON, OF COLUMBIANA, OHIO.

FRUIT-DRIER.

SPECIFICATION forming part of Letters Patent No. 253,609, dated February 14, 1882.

Application filed December 24, 1881. (No model.)

*To all whom it may concern:*

Be it known that I, JAMES J. JOHNSTON, of Columbiana, in the county of Columbiana and State of Ohio, have invented a certain new and useful Improvement in Fruit-Driers; and I do hereby declare that the following is a full, clear, and exact description thereof, reference being had to the accompanying drawings, and to the letters of reference marked thereon.

My invention consists in constructing a fruit-drier cylindrical in form, with the drying-chamber surrounded with a heating-chamber having spiral partitions for causing the heat to travel around the drying-chamber in an upward spiral course, said chambers being divided longitudinally into two parts, which are hinged together so that the drying-chamber may be opened for the purpose of placing in said chamber the trays containing the fruit to be dried, and also for removing the trays therefrom when the fruit is dried, the whole being constructed, arranged, and operating as will hereinafter more fully and at large appear.

To enable others skilled in art with which my invention is most nearly connected to make and use it, I will proceed to describe its construction and operation.

In the accompanying drawings, which form part of this specification, Figure 1 is a perspective view of my improvement in fruit-driers, representing it opened for removing or placing therein the trays containing the fruit, or for examination of the fruit while under the process of drying it. Fig. 2 is a vertical section of the fruit-drier. Fig. 3 is a transverse horizontal section of the same at line $y\,y$ of Fig. 2.

The base A is constructed of cast metal and forms a section of a sphere, having a vertical flange, B, and an opening, C.

The drying-chamber D, heating-chamber E, and spiral partitions F are constructed of sheet metal.

The trays $g$, for holding the fruit, may be constructed of any suitable material and in the form shown in the accompanying drawings; but preference is given to wire open-work with a sheet-metal band, similar to a sieve, as shown in Fig. 3.

The case $h$, which forms the drying-chamber D, is constructed in two parts, $i\,j$, which are held in position and are secured to the case $k$ by means of the partitions F, which are first attached to the case $k$, and then the parts $i\,j$ are attached to said partitions. The case $k$ is also constructed in two parts, one of which is provided with a flange, $l$, which projects over the other part, as shown in Figs. 2 and 3, for the purpose of covering the joint between the two parts when brought together, as shown in Fig. 3.

The part $i$ of the case, forming the drying-chamber, is furnished with a similar flange, $m$, for covering the joint formed by the union of the parts $i\,j$, which is also shown in Fig. 3. The two parts of the casing $k$ are hinged together by hinges $n$, the pintle $o$ of which is secured to the base A and made in the form shown by the dotted lines in Fig. 2, for the purpose of securing strength and stiffness, and may have three limbs, two of which brace and stiffen the pintle proper of the hinge.

The case $k$ is furnished with a flue, P, for giving current to the heated air in the chamber E, and for carrying said heat when it has performed its office.

The flue P may be provided with a valve or damper, for the purpose of regulating the flow of heated air through the chamber E.

The casing $h$ of the drying-chamber is furnished with a large number of small openings, $s$, for the inlet of heated air from chamber E into the drying-chamber D, and openings $w$, for the outlet of moisture arising from the fruit in said drying-chamber, which moisture is carried off through the flue P.

The trays $g$ are supported one above the other by means of projecting lugs $v$ on the inner wall of the casing $i\,j$, and by notches in the lower edge of the rim of the trays are held in each half of the casing $h$, so that when the drying-chamber D is opened, as shown in Fig. 1, the trays will be alternately in the parts $i\,j$, thereby leaving sufficient space between the trays to examine and stir the fruit in the process of drying it.

The drier is furnished with handles $u$ for manipulating it.

The operation of my improvement in fruit-driers is as follows: The desired quantity of the fruit to be dried is spread in the trays $g$, which are placed alternately in the parts $i\,j$ of the drying-chamber D, as shown in Fig. 1, which is then closed, as shown in Fig. 3. The drier is then placed upon a heated stove, and the heat rising up in the hollow base A passes into the heating-chamber E, is caused by the spiral partitions F to travel upward and spirally around the drying-chamber D, into which it enters through the openings s, and finally, with the moisture arising from the fruit in the process of drying, passes out through the openings w and is carried off through the flue P.

Having thus described my improvement, what I claim as of my invention is—

1. A cylindrical fruit-drier consisting of a base forming a section of a hollow sphere, having a vertical flange and opening, a drying-chamber having perforated walls, and surrounded with a heating-chamber having spiral partitions and a flue, said chambers divided vertically into two parts, and hinged together on said base, substantially as herein described, and for the purpose set forth.

2. In a fruit-drier, the combination of the hollow base A, drying-chamber D, and heating-chamber E, having spiral partitions F, said chambers divided vertically into two parts and hinged together on the base A, substantially as herein described, and for the purpose set forth.

JAMES J. JOHNSTON.

Witnesses:
D. C. ALLEN,
JNO. W. STOCKETT.